Figure 1:
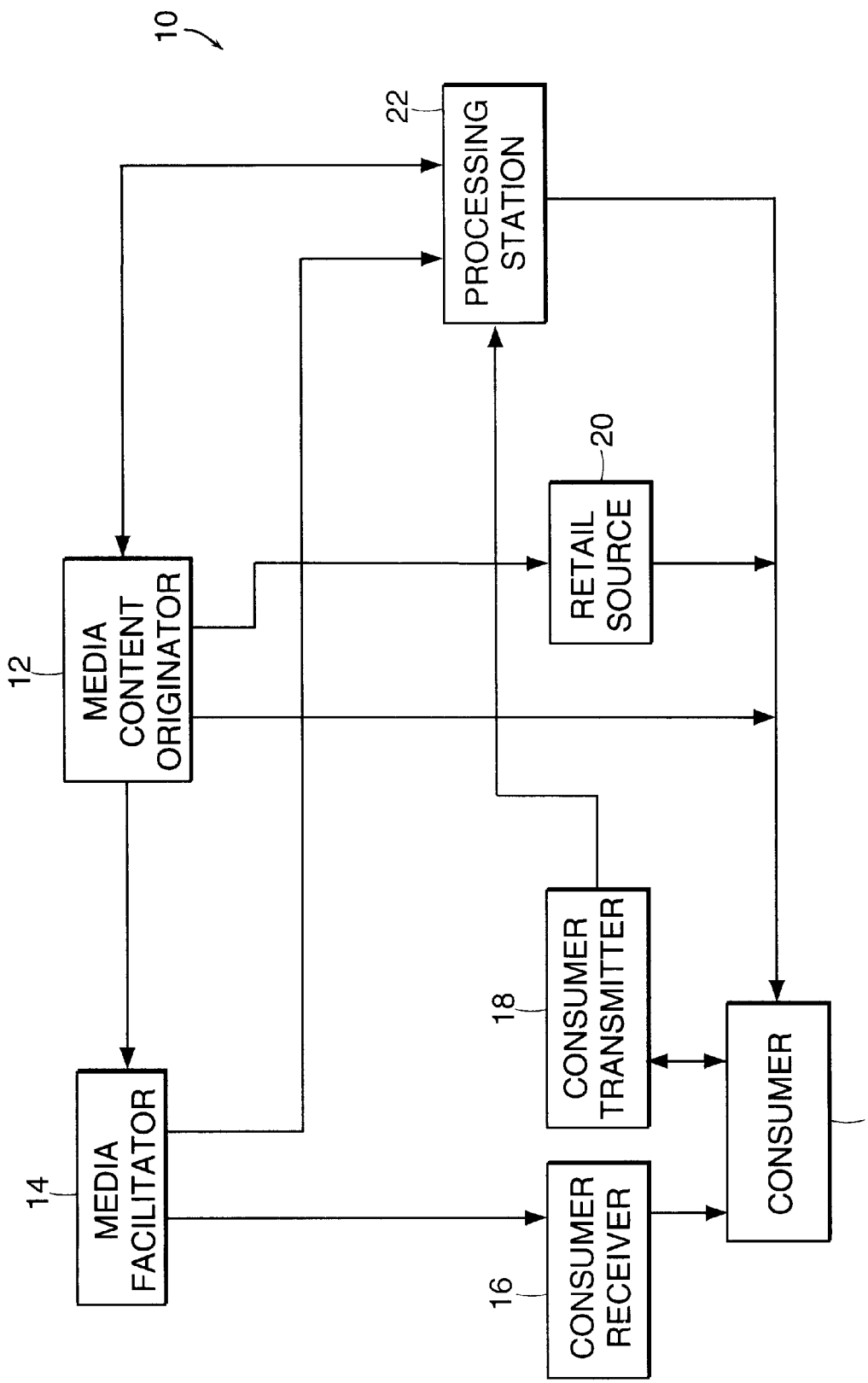

United States Patent

Chen

[11] Patent Number: 5,991,737
[45] Date of Patent: Nov. 23, 1999

[54] AUTOMATED CONSUMER RESPONSE TO PUBLICLY BROADCAST INFORMATION

[75] Inventor: Humphrey D. Chen, West Orange, N.J.

[73] Assignee: ConneXus Corporation, Berwyn, Pa.

[21] Appl. No.: 08/614,965

[22] Filed: Mar. 11, 1996

[51] Int. Cl.[6] .................................................. G06F 17/60
[52] U.S. Cl. ....................................... 705/26; 379/101.01
[58] Field of Search ................................... 705/26, 1, 12, 705/14; 702/73; 379/101.01; 345/327

[56] References Cited

U.S. PATENT DOCUMENTS

| | | | |
|---|---|---|---|
| 4,843,562 | 6/1989 | Kenyon et al. | 702/73 |
| 4,989,233 | 1/1991 | Schakowsky et al. | 379/92 |
| 5,303,393 | 4/1994 | Noreen et al. | 455/3.2 |
| 5,410,326 | 4/1995 | Goldstein | 348/134 |
| 5,539,635 | 7/1996 | Larson, Jr. | 364/401 |
| 5,661,787 | 8/1997 | Pocock | 379/101.01 |
| 5,663,757 | 9/1997 | Morales | 348/13 |
| 5,708,478 | 1/1998 | Tognazzini | 348/552 |

FOREIGN PATENT DOCUMENTS

WO 97/21291  6/1997  WIPO.

OTHER PUBLICATIONS

Bachman, Katy; "Now You Can Interact With Your Radio; New Interactive Radio Known As Coupon–Radio"; Oct., 1994; Information Access Company, ASAP, vol. 6, No. 10, p. 32; Cowles Bus. Media, Direct, ISSN: 1046–4174.

Crain communications Inc.; "Cellular Linking Brings Advertisers in Contact With Mobile Consumers"; Sep. 18, 1995; Radio Comm. Report, News, p. 86.

Eng, Paul M.; "Just Ask the Radio to Name That Tune"; Jun. 19, 1995; McGraw–Hill, Inc.; Business Week, Bits & Bytes, No. 3429, p. 128 H.

Hyatt, Josh (Globe Staff); "Radio Adds a Silent Message; New Technology Allows Stations to Transmit Text As Well As Sound"; Mar. 10, 1994; Globe Newspaper Co.; The Boston Globe, Thurs., City Edition, Economy, p. 43.

Pate, Kelly; "Let Your Imagination Run Wild, New Cellular Innovations Arrive"; Jul. 24, 1995; Cain Communications Inc.; Radio Comm. Report, Special Section, p. 27.

Young, Jeffrey; "You're Playing My Song"; Jul. 5, 1993; Forbes, Inc., Computers/Communications, p. 1140.

Jeffrey Young, "Your're Playing My Song", Forbes, pp. 114–115, Apr. 5, 1993.

"Music Marketers Target Specific Consumers with Ever More Refined Telephone Sampling Srategies", EPM Publishers, Inc., pp. 1–3, Mar. 1993.

Primary Examiner—Emanuel Todd Voeltz
Assistant Examiner—Alexander Kalinowski
Attorney, Agent, or Firm—Testa, Hurwitz & Thibeault, LLP

[57] ABSTRACT

An automated system for enabling consumers to respond to publicly broadcast information includes a content identification processor and an order processor. The content identification processor is configured to identify the content of publicly broadcast information in response to receipt of data specifying the publicly broadcast information. The order processor receives from a consumer an order comprising data specifying information publicly broadcast over a non-interactive medium, communicates the data to the content identification processor, receives an identification of the content of the publicly broadcast information from the content identification processor, and causes action desired by the consumer to be initiated based on the content of the publicly broadcast information. A consumer transmitter device is configured to transmit an order to an order processor at the initiative of a consumer upon receipt by the consumer of publicly broadcast information of interest to the consumer. The consumer transmitter device includes a tuning mechanism and a transmitting and receiving mechanism. The tuning mechanism selects a source of publicly broadcast information, on a waveband of sources of publicly broadcast information, that is being received by the consumer. The transmitting and receiving mechanism transmits to the order processor data specifying the source of the publicly broadcast information selected by the tuning mechanism and receives signals from the order processor in response to receipt by the order processor of the data.

7 Claims, 2 Drawing Sheets

AUTOMATED CONSUMER RESPONSE TO PUBLICLY BROADCAST INFORMATION

The present invention relates in general to a system and method that enables consumers to respond to publicly broadcast information without having to identify the content of the information, and more particularly concerns automated purchasing of recordings of songs played over the radio, automated purchasing of various products advertised on radio, television, billboards, automated responses to publicly broadcast polls, etc.

Information broadcast over public media often stimulates in a consumer of the broadcast information a desire to purchase a product or otherwise to respond in way to the broadcast information. For example, if a consumer hears a song played over the radio, the consumer might desire to purchase a compact disc containing the song, even if the consumer does not know the artist or title of the song. Similarly, a consumer might listen to or watch an advertisement on radio or television and be stimulated to purchase the advertised product. If the consumer remembers the product, the consumer might purchase the product while shopping. Likewise, a broadcast of a poll over the radio or television airwaves can stimulate a listener to call a number provided by the radio or television station in order to respond to the poll.

It is an important object of the invention to provide an improved system and method that enables consumers to respond to publicly broadcast information.

According to the invention, there is an automated system for enabling consumers to respond to publicly broadcast information, including a content identification processor and an order processor. The content identification processor is configured to identify the content of publicly broadcast information in response to receipt of data specifying the publicly broadcast information. The order processor receives from a consumer an order comprising data specifying information publicly broadcast over a non-interactive medium, communicates the data to the content identification processor, receives an identification of the content of the publicly broadcast information from the content identification processor, and causes action desired by the consumer to be initiated based on the content of the publicly broadcast information.

The communication to a content identification processor of data specifying publicly broadcast information and the receipt from the content identification processor of the content of the publicly broadcast information makes it possible for a consumer to order the purchase of a product simply by identifying the broadcast from which the consumer learned of the product. For example, a consumer might order the purchase of a compact disc containing a song being played on FM radio station 107.9 by dialing *CD™1079 on a telephone while the song is being played, even if the consumer does not know the name of the song or the artist. Similarly, a consumer might dial *TV™NBC to order the purchase of a product corresponding to the content being delivered on national television network NBC. A consumer can respond to a broadcast poll by similarly identifying only the broadcast source and then responding to the question. All this is made possible using existing media distribution channels such as ordinary television, radio, and billboards, rather than specialized, interactive media distribution channels.

According to another aspect of the invention, there is a consumer transmitter device configured to transmit an order to an order processor at the initiative of a consumer upon receipt by the consumer of publicly broadcast information of interest to the consumer. The consumer transmitter device includes a tuning mechanism and a transmitting and receiving mechanism. The tuning mechanism selects a source of publicly broadcast information, on a waveband of sources of publicly broadcast information, that is being received by the consumer. The transmitting and receiving mechanism transmits to the order processor data specifying the source of the publicly broadcast information selected by the tuning mechanism and receives signals from the order processor in response to receipt by the order processor of the data. The transmitting and receiving mechanism is operatively connected to the tuning mechanism to enable the transmitting and receiving mechanism to specify to the order processor the source selected by the tuning mechanism.

By providing a tuning mechanism for selecting a source of publicly broadcast information that is being received by the consumer and a transmitting mechanism for transmitting an identification of the source of the publicly broadcast information to an order processor, the invention makes it possible for a consumer simply to set the tuning mechanism to a station to which the consumer is listening and to initiate placement of an order with the order processor whenever an item of interest to the consumer is broadcast over the station, without requiring the consumer to specify the same station each time an order is placed. The tuning mechanism may be synchronized with a separate consumer receiver unit that receives the publicly broadcast information, such as a radio, in which case the consumer need set the tuner of the receiver unit only.

Figure 2:
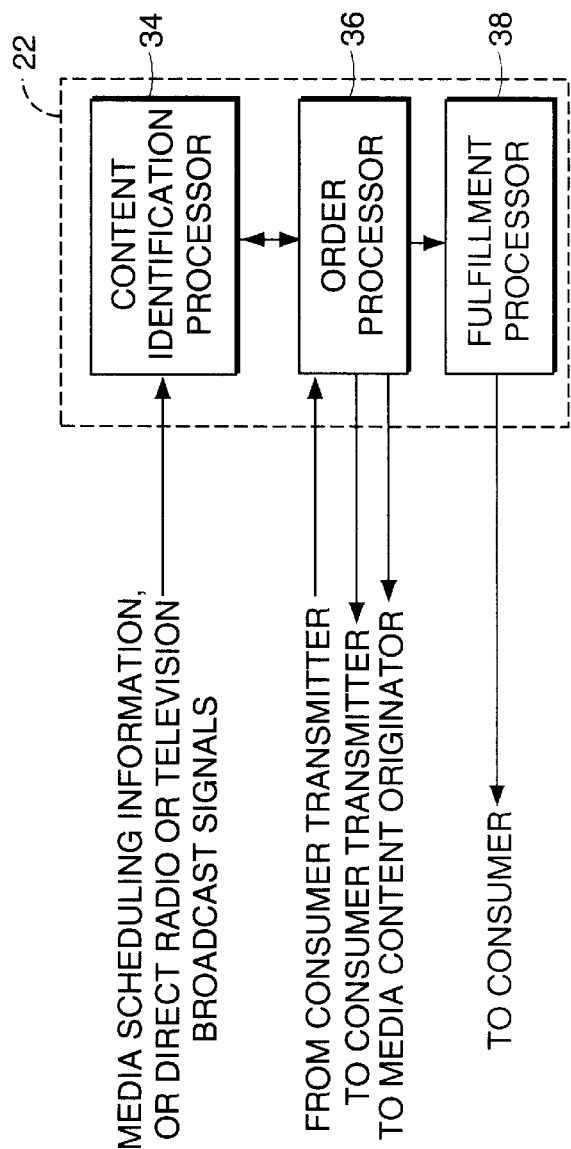
Figure 3:
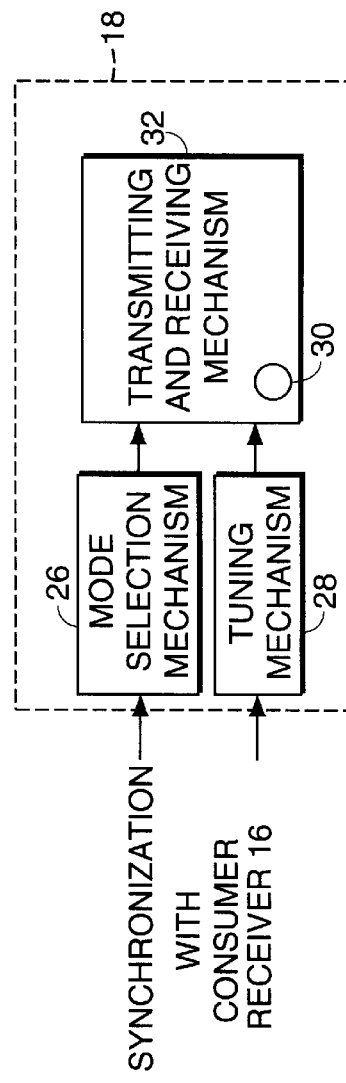

Numerous other features, objects, and advantages of the invention will become apparent from the following detailed description when read in connection with the accompanying drawings in which:

FIG. 1 is a block diagram of an entire broadcast media system in which information is publicly broadcast to a consumer of the information over a non-interactive medium and the consumer can respond to the information without having to identify its content;

FIG. 2 is a block diagram of a processing station configured to receive orders from consumers to purchase products or other consumer responses to publicly broadcast information, and to initiate action desired by the consumer based content of the information, where the data received from the consumer does not identify the content of the information; and FIG. 3 is a block diagram of a consumer transmitter for transmitting orders to a processing station in response to publicly broadcast information.

With reference now to the drawings and more particularly FIG. 1 thereof, broadcast media system 10 includes media content originator 12 (for example, a music manufacturer or distributer), media facilitator 14 (for example, a radio station), consumer receiver 16 (for example, a radio), a consumer transmitter 18 (for example, a cellular telephone), retail source 20 (for example, an establishment that can send a compact disc to the consumer), and a processing station 22 (described in detail below) that receives an order from a consumer 24 by means of consumer transmitter 18, pertaining to broadcast information, identifies the contents of the broadcast information, and causes an action desired by the consumer to be initiated based on the contents of the broadcast information.

Media content originator 12 is an entity who stands to gain from feedback received from consumers of broadcast information. The media content originator could be an agent representing a music artist such as a music manufacturer or a music distributor, an advertiser or a representative who stands to gain from direct interaction with the consumer, a disc jockey or master of ceremonies of a talk radio or television talk show who stands to gain from broadcasts received by the listening audience, or a news correspondent who is eager to poll consumers for their opinions on a presidential election or for traffic conditions. In summary, the media content originator can be any person or entity that creates content that is delivered across media vehicles and stands to gain from receiving feedback.

Media facilitator 14 is a media vehicle that delivers media content to consumers. Current examples include television stations, radio stations, and billboards. The media facilitator takes the media content created by media content originator 12 and translates it into a form that is receivable by consumers.

Consumer receiver 16 is a device that receives signals transmitted by media facilitator 14. Current examples include television sets (including cable and satellite television), radios, and stereo tuners.

Consumer transmitter 18 is a device that can quickly and efficiently identify the broadcast information of interest to the consumer. The consumer transmitter can be, for example, an ordinary telephone, a cellular telephone (analog or digital), a two-way pager, a computer on a public packet switched communications network such as the Internet, or a personal communication service operating on a broadband digital spectrum. Using a cellular telephone, the consumer can dial *CD™1079 (for FM radio station 107.9) to indicate the consumer's interest in purchasing a compact disc that corresponds to the music being played on the radio station. Alternatively, the consumer can dial *TV™NBC (national television network NBC) to indicate the consumer's interest in the content of information being broadcast on NBC at a given moment in time. Likewise, using an ordinary telephone, the consumer can dial a toll free 800 number to connect to the order processing station, and then the consumer can identify a radio station or television network. A similar scheme can be used to indicate a consumer's interest in the contents of a billboard advertisement by communicating only an ID associated with the billboard. More sophisticated examples of consumer transmitters are described below in connection with FIG. 3.

Retail source 20 is any establishment that can participate in the fulfillment of an end product or service to the consumer.

Processing station 22 is a central or distributed facility that monitors the exact scheduling of all media-related events down to the second (where appropriate) in all major geographical regions both domestically and internationally. This includes such forms of sensual stimuli as video content (shows, advertisements, news, etc.), audio content (music, advertisement, news, etc.), and physical visual billboard advertisements. In addition to the above-mentioned monitoring capability, processing station 22 can process the receipt of orders originated by a consumer by means of an automated or manual phone processing center that can provide the consumer with audio or visual confirmation regarding the actual content being ordered and then process the order by receiving customer identification in one form or another (caller ID, unique customer-generated account numbers, social security numbers, etc.). Details of processing station 22 are described below in connection with FIG. 2.

In operation of broadcast media system 10, media content originator 12 provides media content to media facilitator 14 to be broadcast. Media facilitator 14 provides media scheduling information to processing station 22, which stores identification of the contents of the information to be broadcast. Alternatively, media facilitator 14 simply transmits radio or television broadcasts to processing station 22, in which case processing station 22 utilizes pattern recognition technology to identify the contents of the broadcast information. Media facilitator 14 also, of course, transmits broadcasts to consumer receiver 16.

Consumer 24 views, listens, feels, or experiences the media content received by consumer receiver 16, and if consumer 24 wishes to respond to the broadcast information, the consumer interacts with consumer transmitter 18 to cause an order to be transmitted to processing station 22 that includes data specifying the broadcast information (for example, specifying a particular radio or television station or the ID of a billboard), without specifying the content of the broadcast information.

Processing station 22 identifies the content of the broadcast information and responds to the consumer's order by initiating action desired by the consumer (such as the purchase of a product). This process can include feedback, an acknowledgement, or a request for additional information (such as an account number) from the processing station to consumer transmitter 18. Processing station 22 fulfills the order either by sending a product or information directly to consumer 24, or by communicating with media content originator 12, which in turn sends a product or information to consumer 24 either directly, or through retail source 20 where consumer 24 can obtain goods, services, or benefits. Thus, processing station 22 in effect enables direct and indirect wireless or wired interaction between media content originator 12 and consumer 24. Fulfillment of an order can include a charge to a consumer account, which may be an account maintained by processing station 22 or an external account. In certain embodiments in which consumer transmitter 18 is a telephone, a charge may be applied to the consumer's phone bill.

With reference to FIG. 2, processing station 22 includes content identification processor 34, order processor 36, and fulfillment processor 38.

Content identification processor 34 tracks and identifies the content of numerous items of broadcast information on a continuous basis, and stores the content that corresponds to each item of broadcast information. The content identification processor can receive media scheduling information from a media facilitator, or it can receive direct radio or television broadcast signals, in which case the content identification processor utilizes audio or visual pattern recognition technology to identify the content of the broadcast information. For example, the content identification processor can receive a schedule of programming or advertisements, or it can receive direct broadcasts of songs currently being played on various radio stations and, utilizing pattern recognition, identify the songs. The content identification processor stores the identification of the audio or visual contents of the broadcast information, and can respond to a request from order processor 36 that includes data specifying the broadcast information by transmitting to the order processor the identification of the contents of the broadcast information.

Order processor 36 performs either automated or manual processing of incoming orders from a consumer transmitter. The order processor can include an automated attendant voice-mail type processing system utilizing either touch tones or voice recognition as input mechanisms, or an interactive voice response system (IVR). In embodiments in which the consumer transmitter is a computer, the order processor can include a page on the World Wide Web having dialog boxes in which the consumer can enter the data specifying the broadcast information (such as the call letters of a radio station, the city in which the station is located, and the date and time when a certain song was played) as well as dialog boxes in which the consumer can enter account information. The order processor can also store unique customer account identification information. When the order processor receives an order from a consumer transmitter, the order processor communicates with content identification processor 34 to obtain the contents of the broadcast information specified in the order, with the consumer transmitter to provide feedback or request additional information, and with the media content originator to provide useful consumer information or as part of the process of fulfilling the consumer's order.

Fulfillment processor 38 is an order fulfillment mechanism that provides actual product delivery in one form or another to the consumer. In certain embodiments, this function is outsourced to an agent or entity external to processing station 22. In other embodiments, content identification processor 34 is external to processing station 22.

With reference to FIG. 3, sophisticated versions of consumer transmitter 18 include a transmitting and receiving mechanism 32, which can be, for example, multi-way broadband (cellular) or multi-way narrow-band PCS (paging), digital or analog, and alpha-numeric or voice-based, combined with any number of additional features. For example, a mode selection mechanism 26 on the transmitter can select between various modes such as television, radio, advertisements, etc., and a tuning mechanism 28 can select a specific station within a waveband. Mode selection mechanism 26 and tuning mechanism 28 may be set manually by the consumer, or may be synchronized with consumer receiver 16 so that the consumer need only select the mode and station on the receiver without having to manually select the mode and station on the transmitter as well. Once the mode and station have been selected, the consumer can place an order simply by depressing an order button 30 or any similar mechanism to automatically transmit data to an order processing station identifying the mode and the station.

In certain embodiments, consumer transmitter 18 transmits the current date and time to the order processor with each order so that the order processor need not processes the order in real time, and the consumer transmitter can also request and receive from the order processor an update of the order processor's current date and time in order to automatically update the current date and time stored by the consumer transmitter. Certain embodiments of the consumer transmitter can also store and recall data corresponding to broadcast information (the data including a mode such as television, radio, advertisements, etc. combined with an identification of a station within a waveband), thereby making it easy for a consumer to recall quickly a source of broadcast information that is of frequent interest to the consumer. Also, in certain embodiments the consumer transmitter can receive RBDS/RDS signals (Radio Broadcast Data Systems/Radio Data Systems protocol) and ancillary television band signals, which can be used to cause the consumer transmitter to identify for the consumer's convenience the music being played on the radio or to identify other broadcast information (even though the consumer does not need to know this information in order to place an order in response to the broadcast). Various other features can be incorporated into the consumer transmitter, such as security capability and voice activation.

Consumer transmitter 18 and consumer receiver 16 may be combined into one integrated unit.

There has been described novel and improved apparatus and techniques for automated purchasing of products. It is evident that those skilled in the art may now make numerous uses and modifications of and departures from the specific embodiment described herein without departing from the inventive concept.

What is claimed is:

1. A method for transmitting an order to an order processor of an automated system, which independently identifies a content of a publicly broadcast information by performing a pattern recognition search, at the initiatives of a consumer upon receipt by said consumer of publicly broadcast information of interest to said consumer, comprising:

provTiding a consumer transmitter unit which interacts with the automated system, the unit comprising a tuning mechanism and a transmitting and receiving mechanism operatively connected to the tuning mechanism;

selecting a source of publicly broadcast information, on a waveband of sources of publicly broadcast information, that is being received by said consumer through the tuning mechanism;

transmitting to said order processor data specifying said source of said publicly broadcast information selected by said tuning mechanism; and receiving signals from said order processor in response to receipt by said order processor of said data through the consumer transmitter unit.

2. A method of claim 1, further comprising determining which publicly broadcast information is being received by said consumer by direct manipulation of said tuning mechanism by said consumer.

3. A method of claim 1, further comprising determining which publicly broadcast information is being received by said consumer through synchronization of said tuning mechanism with a consumer receiver unit that receives said publicly broadcast information.

4. A method of claim 1, wherein said consumer transmitter unit is configured to store frequently used sources of publicly broadcast information for easy retrieval by said consumer.

5. A method of claim 1, wherein said consumer transmitter unit comprises a telephone.

6. A method of claim 1, wherein said consumer transmitter unit comprises a two-way pager.

7. A method of claim 1, wherein said consumer transmitter unit is configured to receive publicly broadcast signals identifying the content of said publicly broadcast information received by said consumer.

\* \* \* \* \*